United States Patent
Stouffer et al.

(10) Patent No.: US 6,264,095 B1
(45) Date of Patent: *Jul. 24, 2001

(54) HIGH TEMPERATURE ISOSTATIC PRESSURE BONDING OF BERYLLIUM PRESSURE VESSELS WITH AN INTERIOR VOID

(75) Inventors: Charles J. Stouffer, Kensington; Patrick Bourke, Laurel, both of MD (US); James M. Marder, Euclid; Lawrence H. Ryczek, Elmore, both of OH (US)

(73) Assignee: Swales Aerospace, Beltsville, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,349

(22) Filed: Jul. 14, 1999

(51) Int. Cl.[7] .................. B23K 20/00; B23K 28/00; B23K 31/02; B23K 1/19; B23K 20/16
(52) U.S. Cl. ................ 228/193; 228/184; 228/194; 228/262.5
(58) Field of Search .................... 228/193, 194, 228/184, 262.5

(56) References Cited

U.S. PATENT DOCUMENTS

| | | | |
|---|---|---|---|
| 3,082,521 | 3/1963 | Cohen | 29/497 |
| 3,622,313 | * 11/1971 | Havel | 419/49 |
| 3,633,264 | * 1/1972 | Gripshover et al. | 29/421.1 |
| 3,739,617 | 6/1973 | Stejskal | 72/63 |
| 3,774,296 | * 11/1973 | Clay | 228/184 |
| 3,872,576 | 3/1975 | Mott | 29/471.7 |
| 3,940,268 | 2/1976 | Catlin | 75/208 R |
| 3,964,667 | 6/1976 | Anderson | 228/194 |
| 4,096,615 | 6/1978 | Cross | 29/156.8 |
| 4,141,484 | 2/1979 | Hamilton et al. | 228/265 |
| 4,152,816 | 5/1979 | Ewing et al. | 29/156.8 |
| 4,155,157 | 5/1979 | Gersbacher | 29/726 |
| 4,425,698 | * 1/1984 | Petrie | 29/451 |
| 4,429,824 | 2/1984 | Woodward | 228/157 |
| 4,492,669 | 1/1985 | Gould | 419/5 |
| 4,575,327 | 3/1986 | Borchert et al. | 425/78 |
| 4,581,300 | 4/1986 | Hoppin, III et al. | 428/546 |
| 4,660,756 | * 4/1987 | Geisseler | 228/184 |
| 4,988,037 | 1/1991 | Cadwell | 228/265 |
| 5,002,219 | 3/1991 | Cadwell | 228/155 |
| 5,039,475 | * 8/1991 | Kennel et al. | 376/321 |
| 5,090,612 | * 2/1992 | Jones | 228/184 |
| 5,152,452 | * 10/1992 | Fendel | 228/184 |
| 5,154,201 | * 10/1992 | Yanagihara et al. | 137/15 |
| 5,205,470 | * 4/1993 | Cadwell | 228/265 |
| 5,593,085 | 1/1997 | Tohill et al. | 228/193 |
| 5,595,084 | * 1/1997 | Yano | 72/262 |
| 5,615,826 | 4/1997 | Dixon et al. | 228/208 |

FOREIGN PATENT DOCUMENTS

| | | | |
|---|---|---|---|
| 57-28689 | 2/1982 | (JP) | B23K/20/00 |
| 62-34687 | 2/1987 | (JP) | B23K/20/00 |

* cited by examiner

*Primary Examiner*—Tom Dunn
*Assistant Examiner*—Zidia T. Pittman
(74) *Attorney, Agent, or Firm*—Roberts Abokhair & Mardula, LLC

(57) ABSTRACT

A process of bonding metal parts to one another to form seamless, hollow metal articles, particularly made from beryllium. Tooling is assembled to the parts, prior to hot pressing, to cause pressure to be applied to selective portions of the parts. The parts, assembled together with the tooling, are then subjected to hot isostatic pressing at a temperature of about 1700° F. to 1750° F., and at a pressure of about 2000 psi to 2500 psi, for around 3 hours. The tooling surrounding the metal parts functions to limit the amount of compression of the parts. Articles formed by this process are particularly useful in space flight applications because they are formed of a homogeneous material. Strength of the bond is enhanced because no filler metal is used. The absence of a filler metal also eliminates any thermal stress problems as a result of differences in coefficients of thermal expansion.

20 Claims, 5 Drawing Sheets

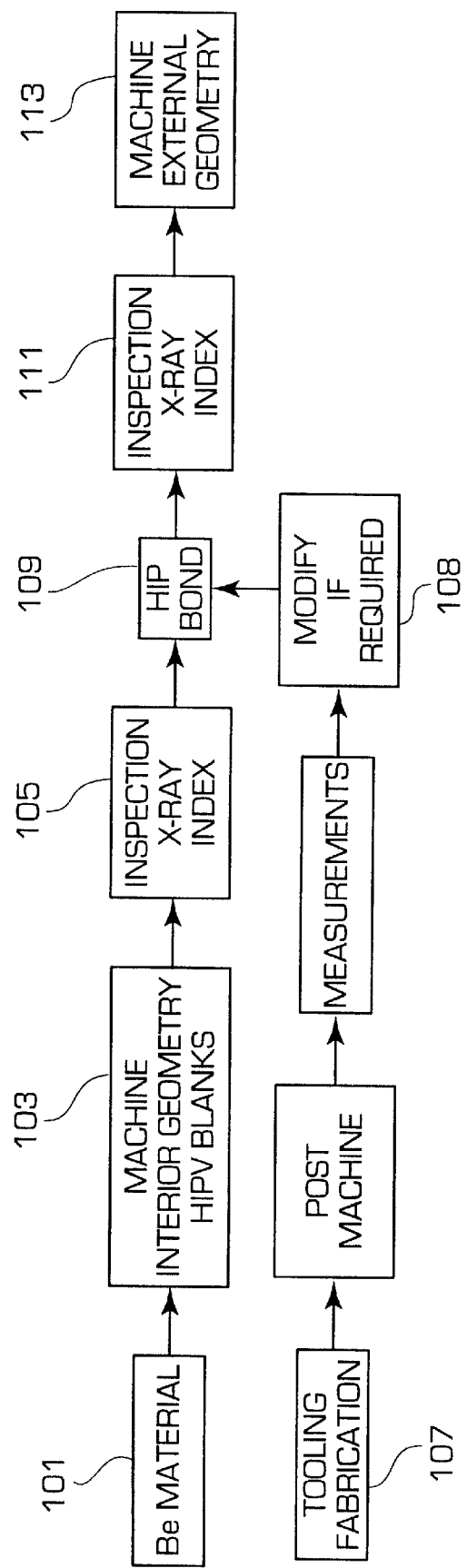

US 6,264,095 B1

HIGH TEMPERATURE ISOSTATIC PRESSURE BONDING OF BERYLLIUM PRESSURE VESSELS WITH AN INTERIOR VOID

This invention was made with Government support under contract No. F29601-95-C-0061 awarded by the Department of the Air Force. The Government has certain rights in the invention.

BACKGROUND OF THE INVENTION

1. Field of the Invention

The present invention relates generally to methods of bonding and sealing together metal parts. In particular, the present invention relates to processes of fabricating and repairing hollow beryllium structures, such as thermal control devices and other pressure vessels for space flight applications, through high temperature isostatic pressure bonding.

2. Background of the Invention

Typically beryllium vessels have been formed by welding or brazing using a filler metal, such as aluminum or silver. The problem with such vessels is that the coefficient of thermal expansion (CTE) of the filler metal is substantially different from that of the bulk beryllium. The use of a filler metal for joining results in low strength properties. Although these methods are adequate for systems that require lower strength properties and do not go through a large range of temperatures during thermal cycling, they reduce the reliability of the system.

U.S. Pat. No. 3,964,667 to Anderson teaches diffusion bonding of beryllium parts under pressure, using a coating of nickel between the beryllium parts. U.S. Pat. No. 5,615,826 to Dixon et al. teaches joining of beryllium parts by welding with an aluminum alloy (e.g., aluminum and silicon).

These bonding methods should not be used with pressure vessels having high internal pressures and that are subjected to large temperature variations, ΔT. One example of such a vessel is a space flight Thermal Storage Unit (TSU). TSUs translate across a large temperature swing (ΔT~300° K), and require large factors of safety in the bond area to meet the aerospace requirements.

A need therefore exists for improved bonding methods that provide the necessary reliability.

SUMMARY OF THE INVENTION

It is therefore an object of the present invention to provide a means for building or repairing fabricated structures, which meets aerospace requirements.

It is a further object of the present invention to provide a hot isostatic pressure (HIP) bond method of sealing outer shells.

It is proposed that the bonding method of the present invention can be used to seal thermal control devices and other pressure vessels for space flight applications. Typically these systems require weight optimization, high reliability and the ability to withstand large temperature cycling throughout their functional life. The HIP bond method of sealing a pair of outer shells is ideal for these applications, providing a seamless vessel with a homogeneous material composition.

Bonding of beryllium shells to form a beryllium vessel with an interior void (HIPV) is a process that requires four interrelated steps: (1) preparation of beryllium blanks; (2) tooling fabrication and assembly of tooling with beryllium blanks; (3) bonding at high temperature and pressure (i.e., the HIP process); and (4) machining of the vessel exterior. Each of these steps is further defined below.

BRIEF DESCRIPTION OF THE DRAWINGS

The invention will be appreciated by review of the following detailed description, in conjunction with viewing of the appended drawing figures.

FIG. 1 illustrates an HIP vessel manufacturing process.

DESCRIPTION OF THE PREFERRED EMBODIMENTS

The steps illustrated in FIG. 1 summarize the HIPV manufacturing process according to a preferred embodiment. The HIPV manufacturing process comprises four interrelated steps: (1) preparation of beryllium blanks; (2) tooling fabrication and assembly of tooling with beryllium blanks; (3) bonding at high temperature and pressure (i.e., the HIP process); and (4) machining of the vessel exterior. Each of these steps is further described as follows.

1. Preparation of Beryllium Blanks

A plurality of blanks are fabricated. Each of the blanks has an interior cavity that will yield the required final interior void when the blank is bonded to a mating blank. Starting with Be material 101, the interior cavity geometry is machined 103 into the block. Optionally, a portion of the exterior geometry is machined at this time.

Figure 2A:
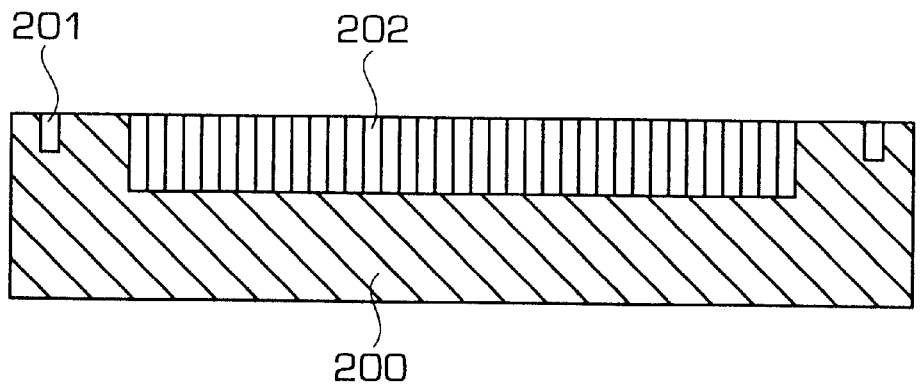
FIG. 2A illustrates a typical cross-sectional view of an HIP vessel blank prepared according to the method of the present invention.
Figure 2B:
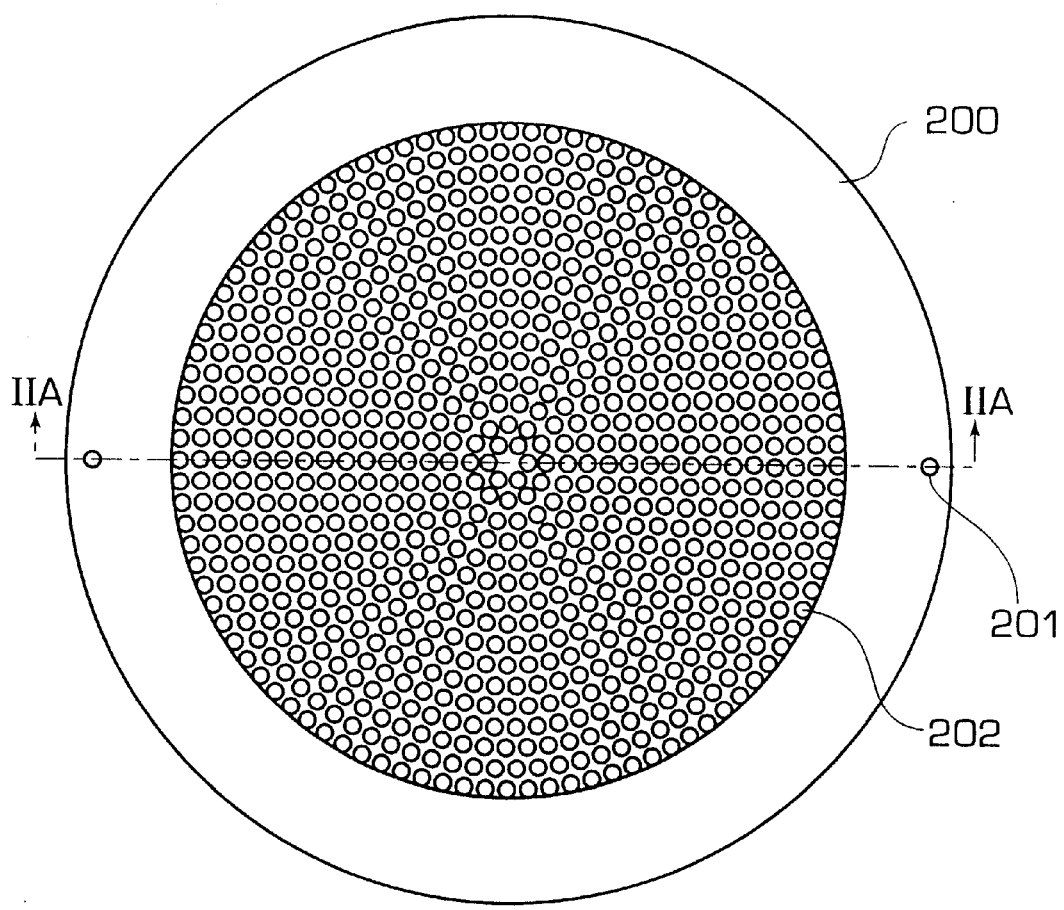
FIG. 2B illustrates a plan view of an HIP vessel blank prepared according to the method of the present invention.

Factors to be considered in dimensioning the interior geometry of the blank include the dimensions of the final article and the amount of compression that will be obtained during the bonding process. FIGS. 2A and 2B show a cross sectional view and a plan view, respectively, of a metal blank 200. The preferred method for precisely machining the void volume into the metal blank 200 is to drill a plurality of holes 202 into the blank. A plurality of alignment holes 201 are also drilled into the blank 200. None of holes 201 or 202 are drilled through the blank 200.

Besides mechanical machining (drilling, milling, etc.), alternate embodiments of the method according to the invention form the internal cavity in the blank by extrusion, by electrical discharge machining (i.e., "EDM"), or by etching.

2. Fabrication and Assembly of Tooling

Figure 3A:
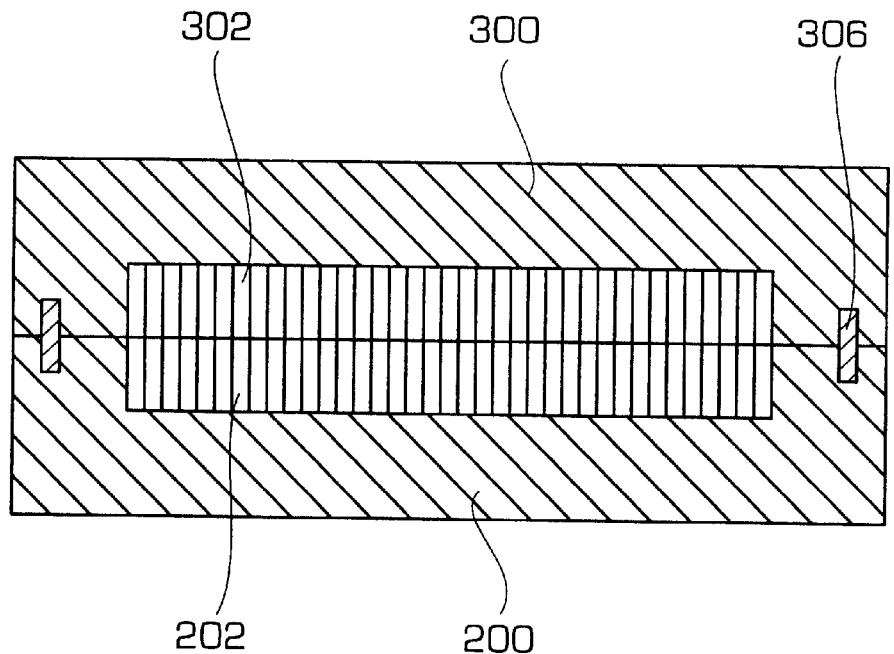
FIG. 3A illustrates a cross-sectional view of two HIP vessel blanks assembled together with tooling pins.
Figure 3B:
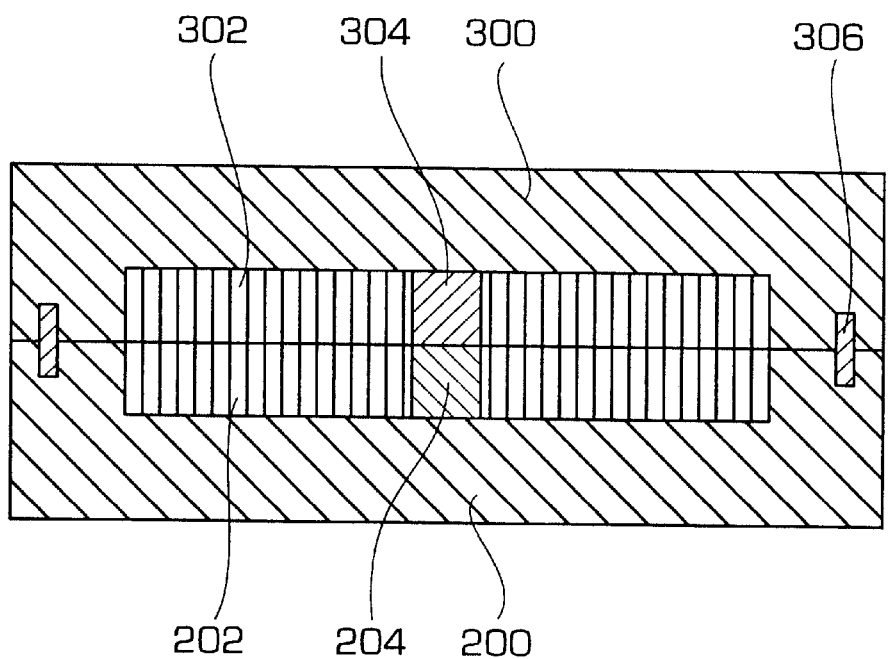
FIG. 3B illustrates a cross-sectional view of two HIP vessel blanks assembled together with tooling pins, according to an alternate embodiment.

After the blanks 200, 300 have been fabricated they are assembled, as shown in FIG. 3A, with tooling pins 306 to aid in the alignment throughout the HIPV process. FIG. 3B illustrates an alternate embodiment where pillars 204, 304 are placed in the cavities formed by the drilled holes 202, 302. Although the pillars 204, 304 are not required for the practice of the HIP method according to the present invention, they are useful for ensuring that the article does not collapse during the HIP process.

The tooling used in the HIP process controls the direction of compression and limits the amount of compression of the subject parts during bonding. The tooling must be fabricated 107 to have the appropriate physical dimensions for the particular article being worked on. Refer to FIG. 1.

Figure 4:
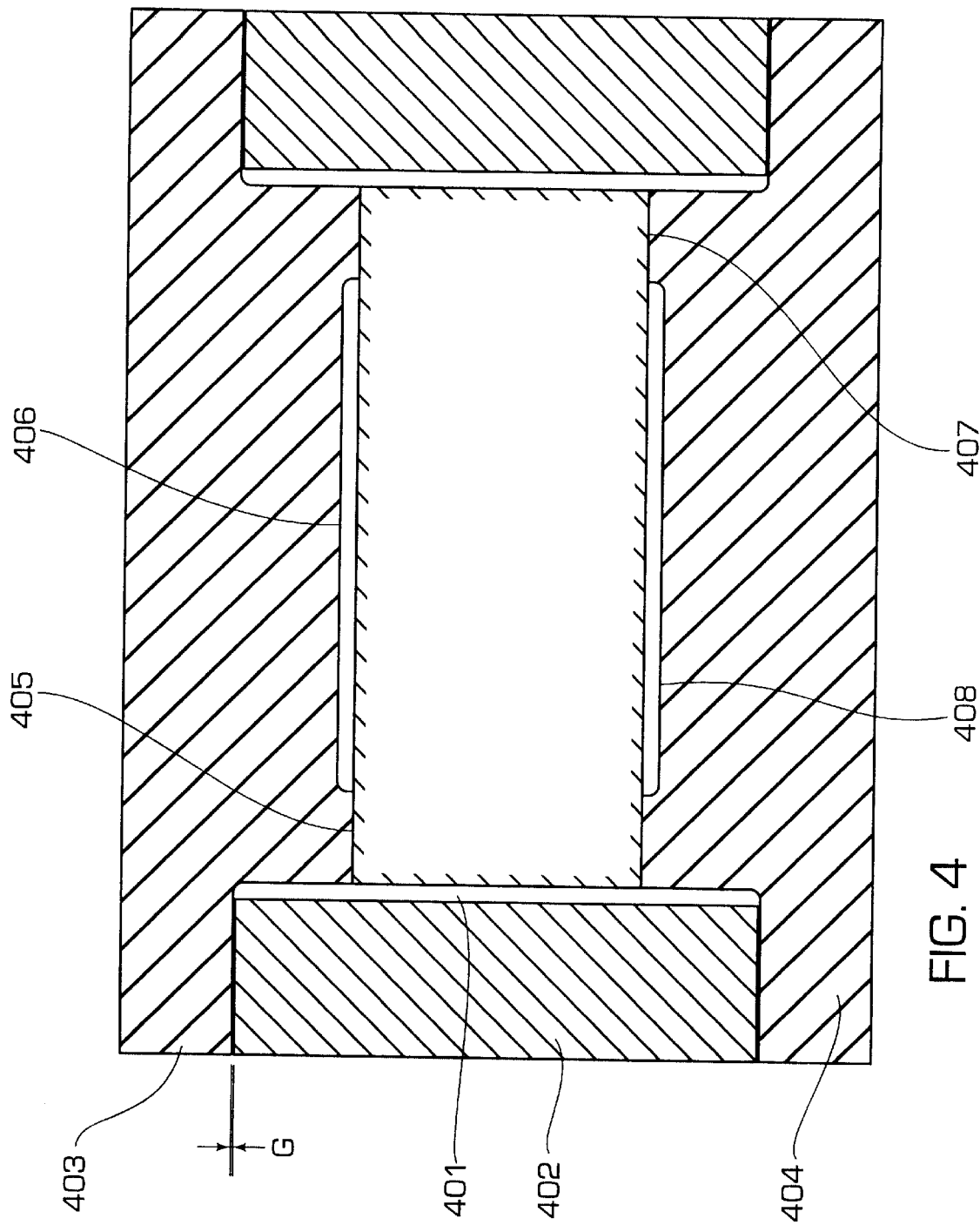
FIG. 4 illustrates a cross-sectional view of an article to be bonded in combination with a tooling assembly.
Figure 5:
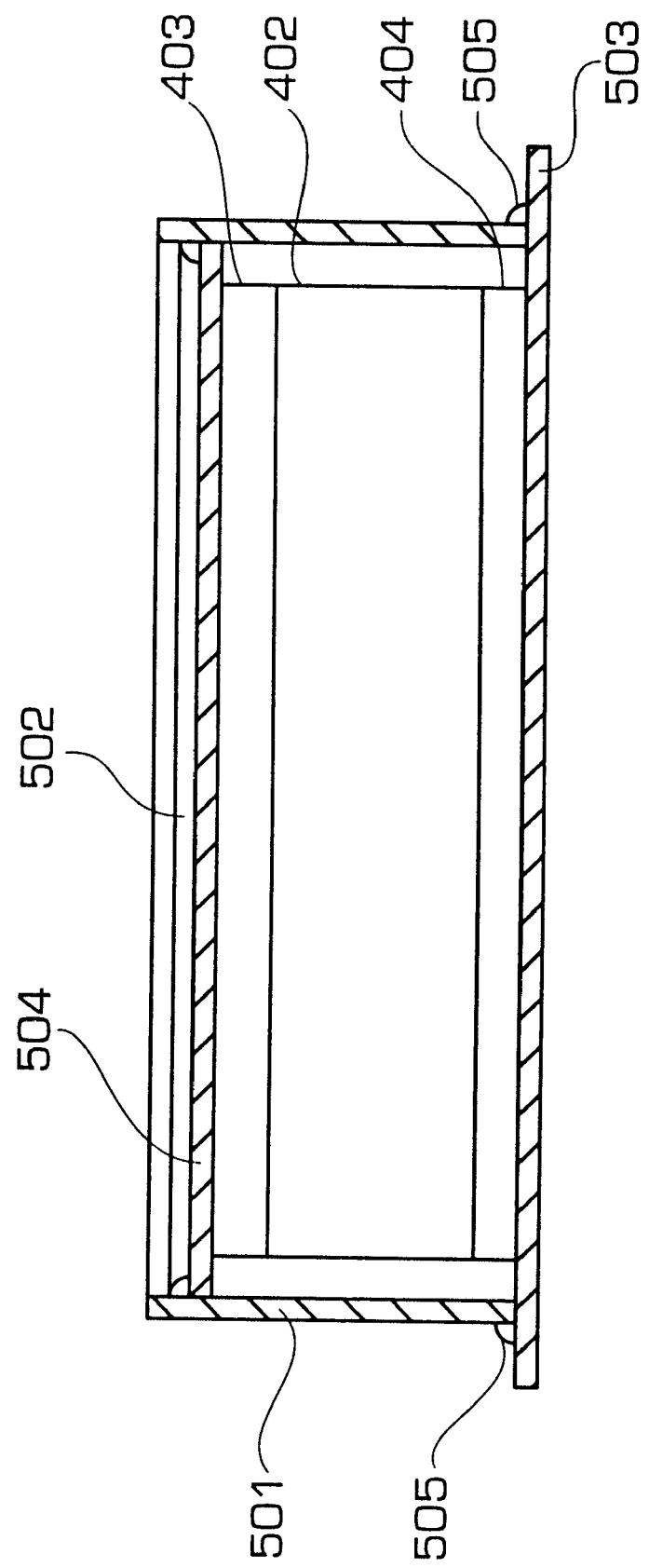
FIG. 5 illustrates a partial cross-sectional view of a tooled assembly enclosed in a sealed can and ready for HIP.

In the example shown in FIG. 4, bonding compression of the article 401 (i.e., blanks 200, 300 assembled as in FIG. 3A or FIG. 3B) is constrained to only one direction. A circular ring 402 around the outside of the article 401 prevents any compression/bonding to occur in the horizontal direction. A small gap between the article and the surrounding wall is implemented to insure no contact/bonding occurs in the horizontal direction. The top 403 and bottom 404 tooling plates (or flanges) are designed to contact the article only in the locations requiring bonding 405, 407 by means of recesses 406, 408. The shoulder on the top 403 plate is cut short 108 (see FIG. 1) to regulate the amount of compression upon the article. The compression stops when the shoulder of the top plate 403 comes in contact with the top of the outer ring 402. A typical compression gap, G, is 0.020–0.040 inches, depending upon the application.

Material used for the tooling (402, 403, 404) must show sufficient strength at 1700° F. to withstand the 2000-psi pressure without deforming, so as to protect the article from inadvertent over-compression. Examples of suitable tooling materials are Inconel 718, IN 100, and molybdenum, due to their ability to maintain strength at high temperatures. Generally, materials that can maintain strength at high temperatures are applicable.

Before the article is completely assembled with the tooling structures, the baseline positions of the exterior and interior features of the article are registered 105. This registration of positions is done using x-rays and scribe indexing.

As a final step of the tooling process, the tooled article is placed in a seal welded (usually steel) can.

3. The HIP Process

After the article/tooling assembly is sealed in a can, the assembly is then placed in a Hot Isostatic Press (HIP) and pressurized 109 at a high temperature. As a working example, a beryllium article is placed in a Hot Isostatic Press and pressurized to over 1900 psi (preferably 2000–2500 psi) at a temperature of over 1650° F. (preferably 1700–1750° F.) for about three hours. These parameters work well for beryllium. These parameters can be varied substantially depending on the particular article and depending on apparatus limitations. When the article is to be formed of a material other than beryllium, the parameters are varied to suit the properties of the chosen material.

4. Final Machining

After pressing is completed, the article is removed from the HIP canister and the tooling. X-Ray imaging and index identification are performed 111 to identify the location of physical features such as the interior void. The exterior of the article is then machined 113 using conventional techniques to give it any desired exterior shape (not shown).

HIP vessel bonding according to the method of the present invention is also useful for bonding metals other than beryllium. Examples of other suitable materials for practice of the invention are beryllium/aluminum alloy, titanium, stainless steel, and aluminum.

The bonding method of the present invention is useful for making thermal control devices, propulsion systems, cryogenic coolers, heat exchangers, and other pressure vessels. Such pressure vessels are useful for scientific detectors and for space flight applications. A heat exchanger made according to the disclosed method is useful for automotive applications as a radiator. Typically these systems require weight optimization, high reliability and the ability to withstand large temperature cycling throughout their functional life.

The present invention has been described in terms of a preferred embodiment. However, numerous modifications and variations may be made to the described embodiment without departing from the scope of the invention as disclosed. The invention is limited only by the appended claims.

What is claimed is:

1. A process of manufacturing a hollow metal article, the process comprising:

preparing metal blanks to have processed cavities, said processed cavities being formed by a method selected from the group consisting of: mechanical machining, electrical discharge machining, and extrusion;

providing tooling structure;

assembling the tooling structure with the blanks; and bonding the blanks to one another at high temperature and pressure to form a hollow metal article;

wherein each of the metal blanks is formed from beryllium or a beryllium aluminum alloy, and wherein the hollow metal article is a pressure vessel.

2. The process of claim 1, the process further comprising:

machining the exterior of the metal article to provide a desired finished exterior profile.

3. The process of claim 1, wherein said processed cavities are formed via mechanical machining.

4. The process of claim 1, wherein said processed cavities are formed via electrical discharge machining.

5. The process of claim 1, wherein the cavities in each of the metal blanks are prepared so that the hollow metal article has an internal void of a predetermined volume.

6. The process of claim 5, further comprising drilling a plurality of holes into each metal blank to form a void.

7. The process of claim 1, wherein the tooling structure is provided having predetermined physical dimensions to limit to what extent the metal blanks shall be compressed when the blanks are bonded to one another.

8. A process of manufacturing a hollow metal article, the process comprising:

preparing metal blanks to have processed cavities, said processed cavities being formed by a method selected from the group consisting of: mechanical machining, electrical discharge machining, and extrusion;

providing tooling structure;

assembling the tooling structure with the blanks; and bonding the blanks to one another at high temperature and pressure to form a hollow metal article;

wherein each of the metal blanks is formed from beryllium or a beryllium aluminum alloy, and wherein the hollow metal article is a pressure vessel; and wherein assembling the tooling structure with the blanks includes enclosing the blanks and the tooling structure together inside a sealed canister.

9. The process of claim 1, wherein bonding the blanks to one another is performed under substantially vacuum conditions.

10. The process of claim 1, wherein bonding the blanks to one another is performed by applying a pressure to the metal blanks via the tooling structure.

11. The process of claim 1, wherein bonding the blanks to one another is performed at a temperature in excess of 1650° F.

12. The process of claim 11, wherein bonding the blanks to one another is performed within a temperature range of about 1700° F. to 1750° F.

13. The process of claim 1, wherein bonding the blanks to one another is performed by applying a pressure in excess of 1900 psi to the metal blanks via the tooling structure.

14. The process of claim 13, wherein the applied pressure is within the range of about 2000 psi to 2500 psi.

15. The process of claim 13, wherein bonding the blanks to one another is performed at a temperature in excess of 1650° F.

16. The process of claim 15, wherein bonding the blanks to one another is performed within a temperature range of about 1700° F. to 1750° F.

17. The process of claim 16, wherein the applied pressure is within the range of about 2000 psi to 2500 psi.

18. The process of claim 1, wherein one or more support pillars are disposed in said processed cavities.

19. A process of manufacturing a hollow metal article, the process comprising:
    preparing metal blanks to have processed cavities, said processed cavities being formed by a method selected from the group consisting of: mechanical machining, electrical discharge machining, and extrusion;
    providing tooling structure;
    assembling the tooling structure with the blanks; and
    bonding the blanks to one another at high temperature and pressure to form a hollow metal article;
    wherein one or more support pillars are disposed in said processed cavities.

20. The process of claim 19, wherein the tooling structure is provided having predetermined physical dimensions to limit to what extent the metal blanks shall be compressed when the blanks are bonded to one another.

* * * * *